United States Patent
Marcoccia et al.

(10) Patent No.: US 11,288,215 B2
(45) Date of Patent: Mar. 29, 2022

(54) MAPPED REGISTER ACCESS BY MICROCONTROLLERS

(71) Applicant: Juniper Networks, Inc., Sunnyvale, CA (US)

(72) Inventors: Roberto Marcoccia, San Jose, CA (US); Sean P. Woyciehowsky, San Jose, CA (US); George R. Sosnowski, Sunnyvale, CA (US); Theodore J. Schmidt, Lucas, TX (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/005,749

(22) Filed: Aug. 28, 2020

(65) Prior Publication Data

US 2022/0066956 A1 Mar. 3, 2022

(51) Int. Cl.
*G06F 13/40* (2006.01)
*G06F 13/42* (2006.01)
*G06F 13/16* (2006.01)

(52) U.S. Cl.
CPC ...... *G06F 13/1668* (2013.01); *G06F 13/4068* (2013.01); *G06F 13/4282* (2013.01)

(58) Field of Classification Search
CPC ............. G06F 13/1668; G06F 13/4068; G06F 13/4282
See application file for complete search history.

(56) References Cited

U.S. PATENT DOCUMENTS

| | | | | |
|---|---|---|---|---|
| 4,791,446 A | * | 12/1988 | Ishida | G02B 7/34 396/100 |
| 9,734,099 B1 | * | 8/2017 | Argoetti | G06F 13/1689 |
| 2013/0249290 A1 | * | 9/2013 | Buonpane | G06F 1/3209 307/31 |
| 2015/0089021 A1 | * | 3/2015 | Bergbauer | G06Q 10/101 709/217 |
| 2016/0292109 A1 | * | 10/2016 | Schumacher | G06F 13/1673 |
| 2016/0350240 A1 | * | 12/2016 | Grafton | G06F 13/1668 |
| 2020/0192455 A1 | | 6/2020 | Kumar et al. | |

OTHER PUBLICATIONS

"European Application Serial No. 20207956.2, Extended European Search Report dated Jun. 23, 2021", 8 pgs.
St Life Augmented, "Quad-SPI interface on STM32 microcontrollers and microprocessors", [Online], Retrieved from the Internet: <URL:https://www.st.com/resource/en/application_note/dm00227538-quadspi-interface-on-stm32-microcontrollers-and-microprocessorsstmicroelectronics.pdf>, (Apr. 30, 2020), 95 pages.
Xilinx, "Zynq UltraScale+ Device Technical Reference Manual", [Online], Retrieved from the Internet: <http://xilinx.eetrend.com/files/2020-02/wen_zhang_/100047478-89924-ug1085-zynq-ultrascale-trm.pdf>, (Aug. 21, 2019), 1214 pages.

\* cited by examiner

*Primary Examiner* — Idriss N Alrobaye
*Assistant Examiner* — Ronald T Modo
(74) *Attorney, Agent, or Firm* — Schwegman Lundberg & Woessner, P.A.

(57) ABSTRACT

A microcontroller can interact with external ASICs using a multi-serial peripheral interface. The ASICs and the microcontroller can be included in an electrical device or an optical-electrical device. The microcontroller can implement the interface to access the registers of the different ASICs in bulk interactions, including a bulk status request, bulk configuration setting, and bulk data reads.

20 Claims, 9 Drawing Sheets

MAPPED REGISTER ACCESS BY MICROCONTROLLERS

TECHNICAL FIELD

The present disclosure generally relates to microcontrollers, and more particularly to data structure access for microcontrollers.

BACKGROUND

Microcontrollers can communicate with off-chip devices using an embedded interface, such as Inter-Integrated Circuit (I2C) and Management Data Input/Output (MDIO). Microcontrollers incur severe performance and overhead limitations in implementing such interfaces for access to devices external to the microcontrollers.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

As discussed, microcontrollers have performance and overhead issues in accessing external off-chip devices. To this end, a multi-serial peripheral interface (e.g., quad serial peripheral interface) that microcontrollers can use to access flash memory (e.g., external flash) can be reconfigured for mapped access to different registers of different application specific integrated circuits, where which ASIC register is accessed is based on a local memory address accessed by the microcontroller. In the following examples, while QSPI is discussed as an example in which four bidirectional data lines are implemented by the microcontroller to read and write to off-chip registers, in some example embodiments the microcontroller can implement other types of multi-serial peripheral interfaces (e.g., dual quad) for off-chip access to registers, as discussed in further detail below.

Figure 1:
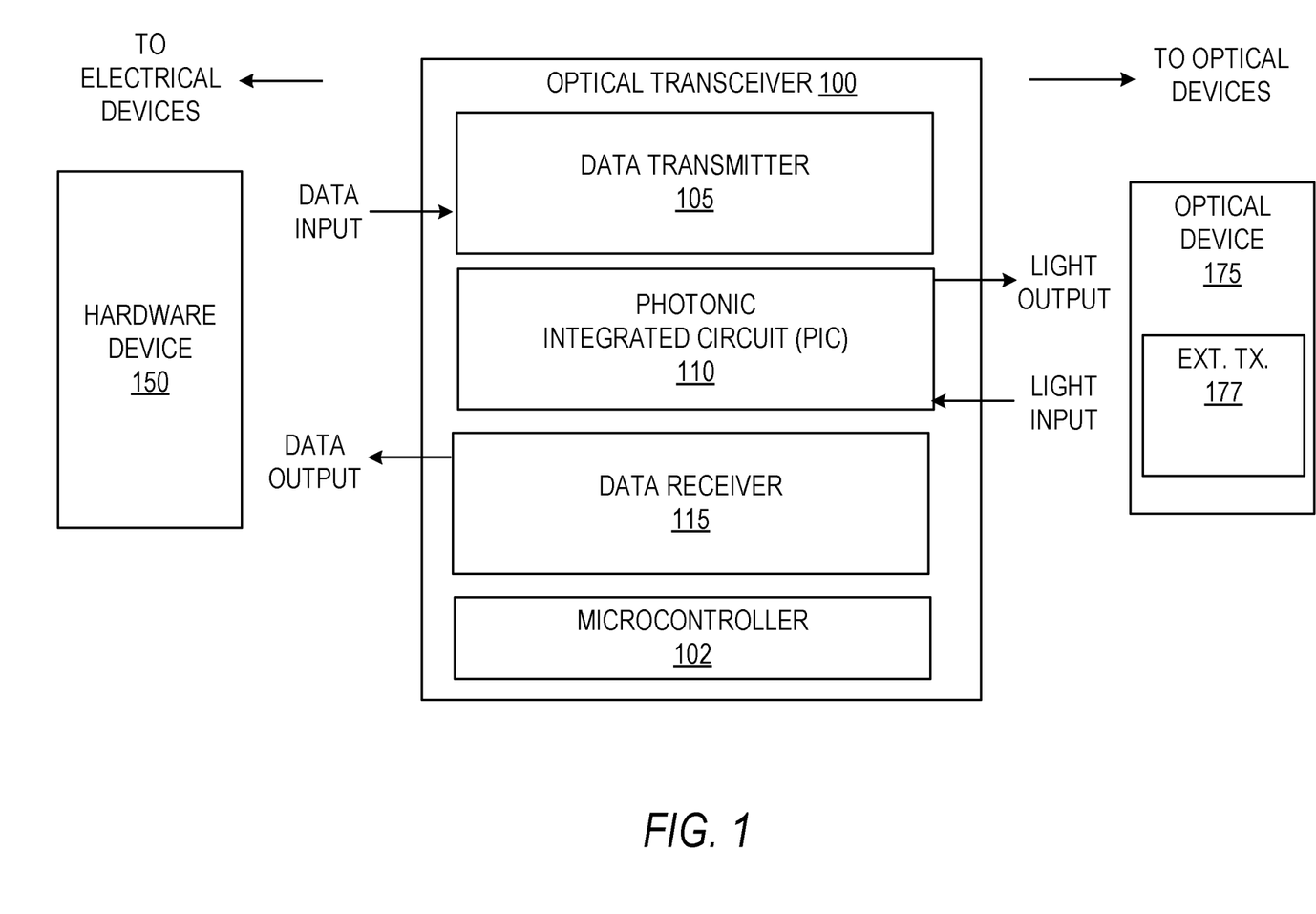
FIG. 1 is a block diagram illustrating an example optical transceiver, according to some example embodiments.

FIG. 1 is a block diagram illustrating an example optical transceiver 100, according to some example embodiments. The optical transceiver 100 is an example photonic device in which a microcontroller 102 can implement quad serial peripheral interface to access registers of other components of the optical transceiver, such as data transmitter 105, data receiver 115, and photonic integrated circuit (PIC) 110. In the example illustrated in FIG. 1, the optical transceiver 100 processes data from electrical devices, such as electrical hardware device 150, converts the electrical data into optical data, and sends and receives the optical data with one or more optical devices, such as optical device 175. For example, the electrical hardware device 150 can be a host board that "hosts" the optical transceiver 100 as a pluggable device that sends and receives data to an optical switch network; where, for example, optical device 175 can be other components of an optical switch network (e.g., external transmitter 177). However, it is appreciated that the optical transceiver 100 can be implemented to interface with other types of electrical devices and optical devices. For instance, the optical transceiver 100 can be implemented as a single chip on a hybrid "motherboard" that uses an optical network (e.g., waveguides, fibers) as an optical bus to interconnect on-board electrical chips that process the data after it is converted from light into binary electrical data, according to some example embodiments.

In some example embodiments, the hardware device 150 includes an electrical interface for receiving and mating with an electrical interface of the optical transceiver 100. The optical transceiver 100 may be a removable front-end module that may be physically received by and removed from hardware device 150 operating as a backend module within a communication system or device. The optical transceiver 100 and the hardware device 150, for example, can be components of an optical communication device or system (e.g., a network device) such as a wavelength-division multiplexing (WDM) system or a parallel fiber system (e.g., parallel-single fiber (PSM)), according to some example embodiments.

In the example illustrated, the optical transceiver 100 includes a microcontroller 102 that controls electrical circuits (e.g., the data transmitter 105, the data receiver 115) and optical components of the PIC 110. The data transmitter 105 of the optical transceiver 100 can receive the electrical signals, which are then converted into optical signals via the optical transmitter components (e.g., modulator, heater) of a photonic integrated circuit (PIC) 110. The PIC 110 can then output the optical signals via optical links, such as fiber or wave guides that interface with the PIC 110. The output light data can then be processed by other components (e.g., switches, endpoint servers, other embedded chips of a single embedded system), via a network such as a wide area network (WAN), optical switch network, optical waveguide network in an embedded system, and others.

The PIC 110 can receive high data rate optical signals via one or more optical links to optical device 175. The optical signals are converted by the optical receiver components from light into electrical signals for further processing by data receiver 115, such as demodulating the data into a lower data rate for output to other devices, such as the electrical hardware device 150. The modulation used by the optical transceiver 100 can include pulse amplitude modulation (e.g., 4-level PAM, such as "PAM4", PAM8, and so on), quadrature phase-shift keying (QPSK), binary phase-shift keying (BPSK), polarization-multiplexed BPSK, M-ary quadrature amplitude modulation (M-QAM), and others.

Figure 2:
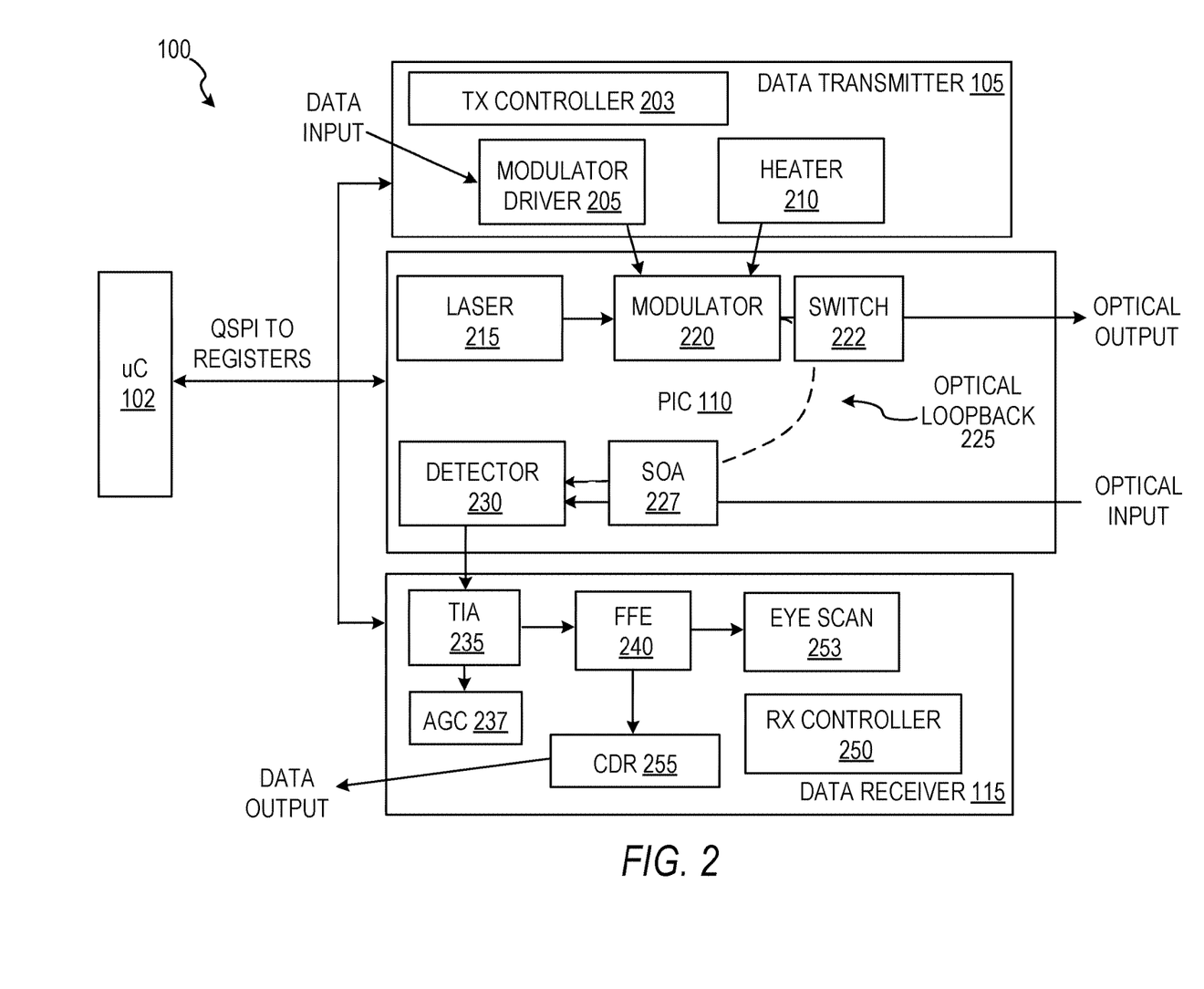
FIG. 2 shows example functional components of the optical transceiver, according to some example embodiments.

FIG. 2 shows example functional components of the optical transceiver 100, according to some example embodiments. The data transmitter 105 manages receiving electrical data and controlling components of the PIC 110 using instructions stored in the transmitter (TX) controller 203 (e.g., a transmitter ASIC). Examples of TX controller 203 include, but are not limited to, a digital signal processing (DSP) unit, a general purpose microcontroller, an ASIC, a field programmable gate array (FPGA), a combination thereof, or other equivalent integrated or discrete logic circuitry with accompanying memory to store control instructions for execution.

In some example embodiments, the data transmitter 105 receives electrical data input from an external device, such as an external host device or host board. The transmitter controller 203 can then execute instructions that convert the electrical data into optical modulation data that the modulator driver 205 uses to control an optical modulator 220 (e.g., phase shifter, electro-absorption modulator (EAM), Mach-Zehnder Interferometer (MZI) modulator) in the PIC 110. The modulator 220 receives light from a light source such as laser 215, which then modulates the received light according to the modulation instructions (e.g., converting binary electrical data to PAM4 modulation or QPSK modulation symbol data), which is then output from the PIC 110 as output light (e.g., output light that is transmitted over an optical switch network). Although the example of FIG. 2 illustrates a simplified version of the data transmitter 105 with various components not included for brevity, it is appreciated that the data transmitter 105 can include additional various components, further discussed below, and in accordance with some example embodiments.

The PIC 110 can receive optical input light (e.g., from a single mode fiber) that is optically amplified via semiconductor optical amplifier (SOA) 227 and then detected by optical detector 230, which can use an optical element, such as a photodiode and/or other elements, to detect the photons in the received light and convert the light into electricity for demodulation processing by the data receiver 115, as discussed in further detail below.

In some example embodiments, the PIC 110 includes an optical loopback path 225 (e.g., integrated waveguide) that directs the output light immediately from the transmitting components to the receiving components to analyze and calibrate the transceiver 100 during design, testing, and manufacturing stages, as well as in the field (e.g., after integration into an end product). The loopback path 225 allows for on-chip or intra module characterization of transceiver 100, including, but not limited to, tests such as bit error rate (BER) characterization, received power characterization, and calibration of filters (e.g., multiplexer, demultiplexer, etc.) present in the transceiver. In some example embodiments, the PIC 110 includes an optical switch 222 that can receive a control signal to direct the output of transmitting component (e.g., modulator 220) towards the receiving components (e.g., detector 230). In some example embodiments, the loopback path 225 switching elements may be comprised of (but not limited to) all or a subset of the following optical components: a thermo-optic switch, a p-i-n diode switch, or a switch network composed of one or more multimode interference (MMI) couplers and Mach Zehnder interferometers (MZIs). The addition of the switching element allows for the imposition of an electrical control signal to determine the routing of the optical signal from the transmitter. For a particular control condition, the switch 222 could enable within PIC (or module) routing of the optical signal from the transmitter to the receiver.

Although the example of FIG. 2 illustrates a simplified version of PIC 110 with various components not included for brevity, it is appreciated that the PIC 110 can include additional various components for sending and receiving light (e.g., MZIs, electro-absorption modulation (EAMs), multiplexers, demultiplexers, filters).

The data receiver 115 manages receiving electrical data from the PIC 110 and processing the electrical data (e.g., amplifying filtering, demodulating) by controlling components of the data receiver 115 using instructions executed and/or stored in the receiver (RX) controller 250. Examples of RX controller 250 include, but are not limited to, a digital signal processing (DSP) unit, a general purpose microcontroller, an ASIC, an FPGA, a combination thereof, or other equivalent integrated or discrete logic circuitry with accompanying memory to store control instructions for execution.

The electricity (e.g., electrical signal, electrical current) generated by the detector 230 can be converted into an amplified electrical voltage by the transimpedance amplifier 235, which is then processed by a feed forward equalizer (FFE) 240. The FFE implements one or more delays to create and combine a delayed version of the signals to filter and enhance the signal. In some example embodiments, the FFE 240 inputs the filtered electrical signal into a receiver eye scan analyzer 253 that can be implemented by the RX controller 250 to analyze the received signal (e.g., by generating one or more eye diagrams).

Further, and in accordance with some example embodiments, the filtered signal is then processed by a clock and data recovery (CDR) module 255 to process and recover timing/clock characteristics of the data (e.g., extract the clock signal and retime the data signal), which is then further processed or is output as data (e.g., for further processing by an external device, such as hardware device 150).

In some example embodiments, the microcontroller 102 accesses components of the transceiver using a QSPI ASIC bus to read and write data to the registers. As an illustrative example, the microcontroller 102 can implement a QSPI interface to access data in a register storing data from the automatic gain control (AGC) 237, which may indicate that the received optical signal exhibits increased optical loss (e.g., as indicated by a higher AGC value in the register data). In response to the reading the AGC register data, the microcontroller 102 may then implement the QSPI interface to set values of other components. For example, the microcontroller 102 can access registers in the data transmitter 105 to modify an operational parameter used by the modulator driver 205 and heater settings for heater 210. As an additional example, the microcontroller 102 can access registers in the PIC 110 to change an operational setting of the SOA 227 (e.g., to increase gain in response to the AGC register data). Although in the examples discussed here, the microcontroller implements a multi-serial peripheral interface (e.g., QSPI) to access registers in an optical transceiver, it is appreciated that other types of devices—including, for example: wireless devices, PCB cards in systems (e.g., routers, PCs), embedded telemetry devices, wired devices, or other optical devices—can likewise implement multi-serial peripheral interface to enable the microcontroller to access off-chip registers, according to some example embodiments. Additional details of accessing and reading and setting optical setting values are discussed in application Ser. No. 16/887,312, titled "Optical Receiver with an Optically Compensated Amplifier Control Loop," filed on May 29, 2020; application Ser. No. 16/907,857, titled "Optical Transceiver Loopback Eye Scans," filed on Jun. 22, 2020; and application Ser. No. 16/887,668, titled "Optical-Electrical Device Using Hybrid Automated Testing Equipment," filed on May 29, 2020; which are hereby incorporated by reference in their in entirety.

Figure 3:
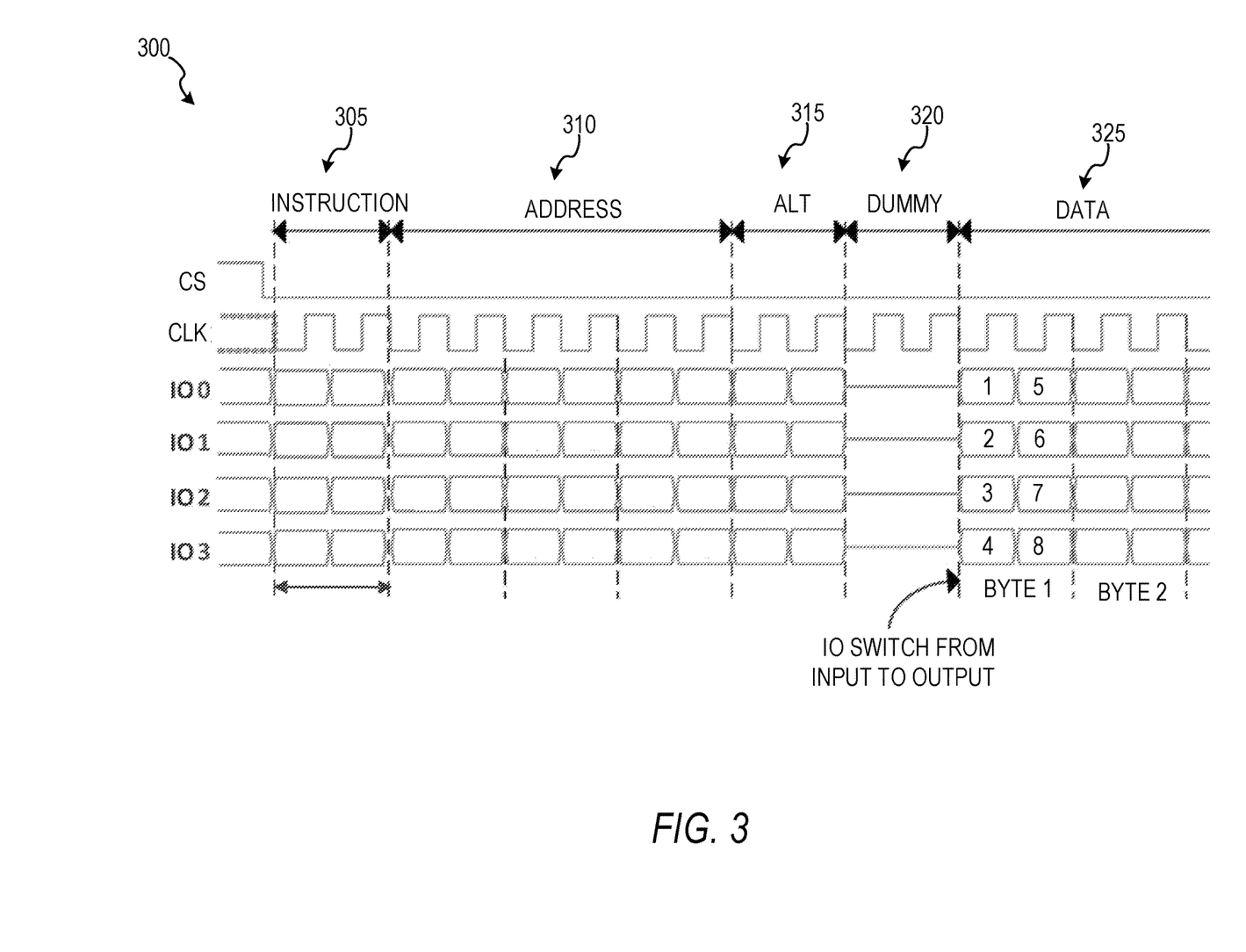
FIG. 3 shows a quad serial peripheral interface (QSPI) architecture for access to application specific integrated circuits (ASICs), according to some example embodiments.

FIG. 3 shows a QSPI interface architecture 300 for access to ASICs, according to some example embodiments. Conventionally, serial peripheral interface (SPI) can be used to access external components (e.g., off chip device), however SPI has a low data rate and incurs performance and microcontroller transactional overhead issues (e.g., data line selection, frequency configurations, bottlenecks). Generally, SPI includes a master interface which controls a slave interface on the peripheral. SPI includes two data lines: a unidirectional line from the master to the slave (Master Output Slave Input (MOSI)), and another unidirectional data line from the slave to the master (Master Input Slave Output (MISO)). Data transfers between the master and the slave occur through simultaneous swaps: data from the master is sent to the slave via the MOSI and other data from the slave is sent to the master via the MISO. If data is to be sent to the slave and there is no return data (e.g., the master is writing data to the slave, and the slave is simply saving the data), then only one of the unidirectional lines is used (the MOSI), and no data is sent over the MISO (or the master device simply ignores or does not read the data on the MISO during the swap). Similarly, if data is to be sent to the master and there is no return data (e.g., the master is reading data from the slave), then only one of the unidirectional lines is used (the MISO), and no data is sent over the MOSI (or the slave device simply ignores or does not read the data on the MOSI during the swap). While SPI can be implemented to access external devices, creating and managing access to the external components using SPI incurs significant microcontroller overhead. For example, bottlenecks can arise when conventional SPI is implemented to read flash memory via a single data line of SPI (even at high data rates of modern SPI).

Multi-serial peripheral interface is a different embedded interface that can be implemented to access flash memory. For example, in QSPI, four bidirectional data lines enable a microcontroller to interface with external flash memory, where the same four data lines can read data in an input direction (e.g., read from memory) and then switch to output data paths to write data on the same data lines (e.g., write to memory). In the example of FIG. 3, the data paths include a chip select line (CS), clock (CLK), and four data lines (IO0, IO1, IO2, IO3). Per clock cycle four bits of data can be transmitted over the four data lines, and a complete byte of data can be sent in two clock cycles, as indicated by "byte 1" (e.g., the first four bits (1-4) are sent in parallel in a first cycle, and the second four bits (5-8) are sent in parallel in the second cycle). Further, in the example illustrated, the instruction portion 305 (e.g., a QSPI command, such as a read or write command) is sent in the first byte, followed by an address portion 310 (e.g., an address of local memory to be decoded/mapped by the receiving QSPI interface to a register), an alt portion 315 (e.g., to be customized for different optional uses or not implemented), followed by a dummy portion 320 that is used to switch the data lines from input to output mode, or vice versa, followed by data portion 325 (e.g., ASIC register data for writing to the ASIC, data read from the ASIC being sent to the microcontroller). In some example embodiments, the chip select is implemented to read select different ASIC devices from which to read and write data using the four data lines. Further, although QSPI is discussed here as an illustrative example in accordance with some example embodiments, it is appreciated that other configurations of multi-serial peripheral interfaces can be implemented in a similar manner. For example, the multi-serial peripheral interface can implement configurations using any multiple of two data lines: dual SPI having just the IO0 and IO1 bidirectional data lines, dual quad SPI having IO0-IO7 data lines, depending on an amount of register data to be accessed by the microcontroller, according to different embodiments and device configurations.

Figure 4:
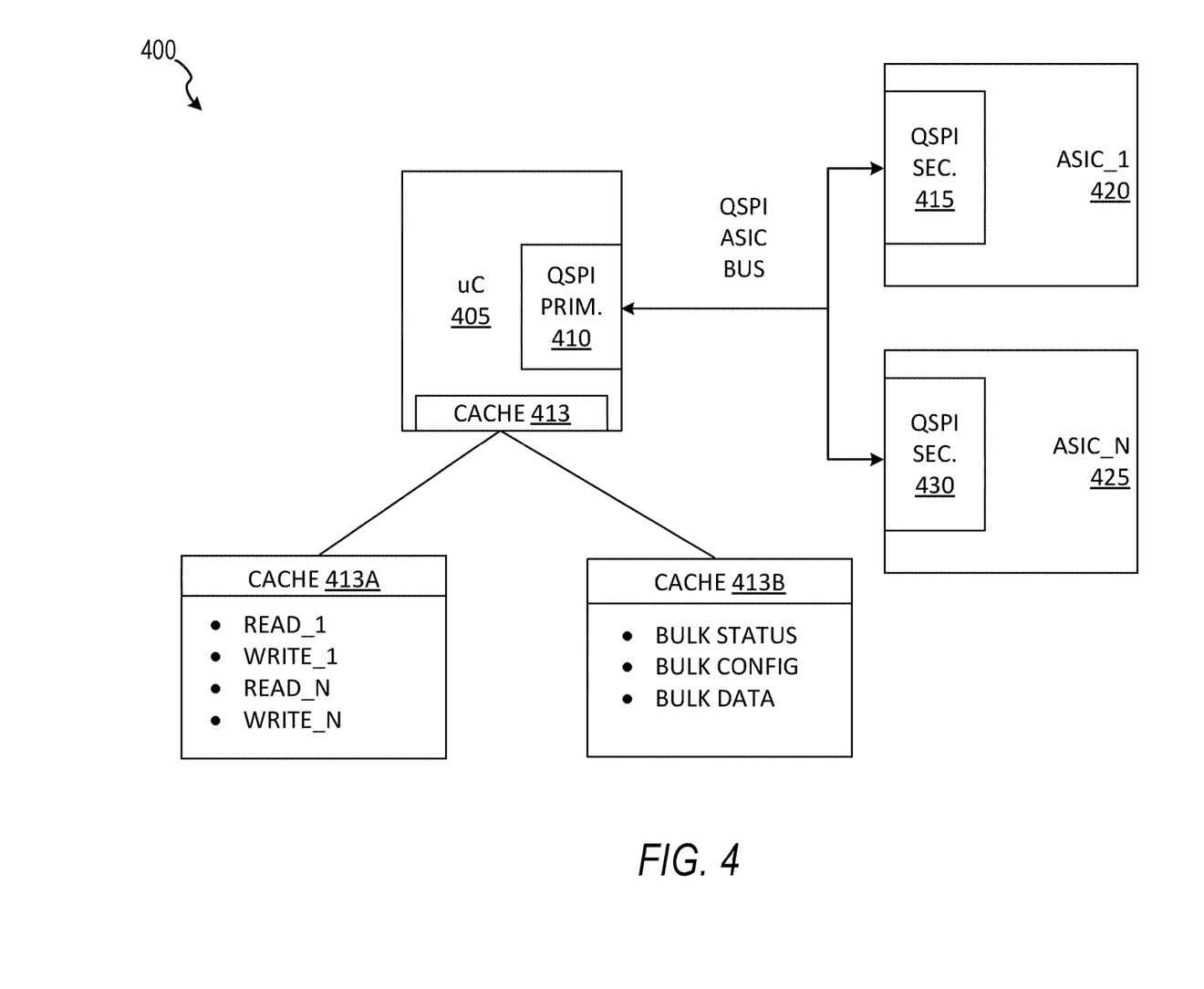
FIG. 4 shows QSPI-ASIC architecture for accessing ASIC register data, according to some example embodiments.
Figure 5A:
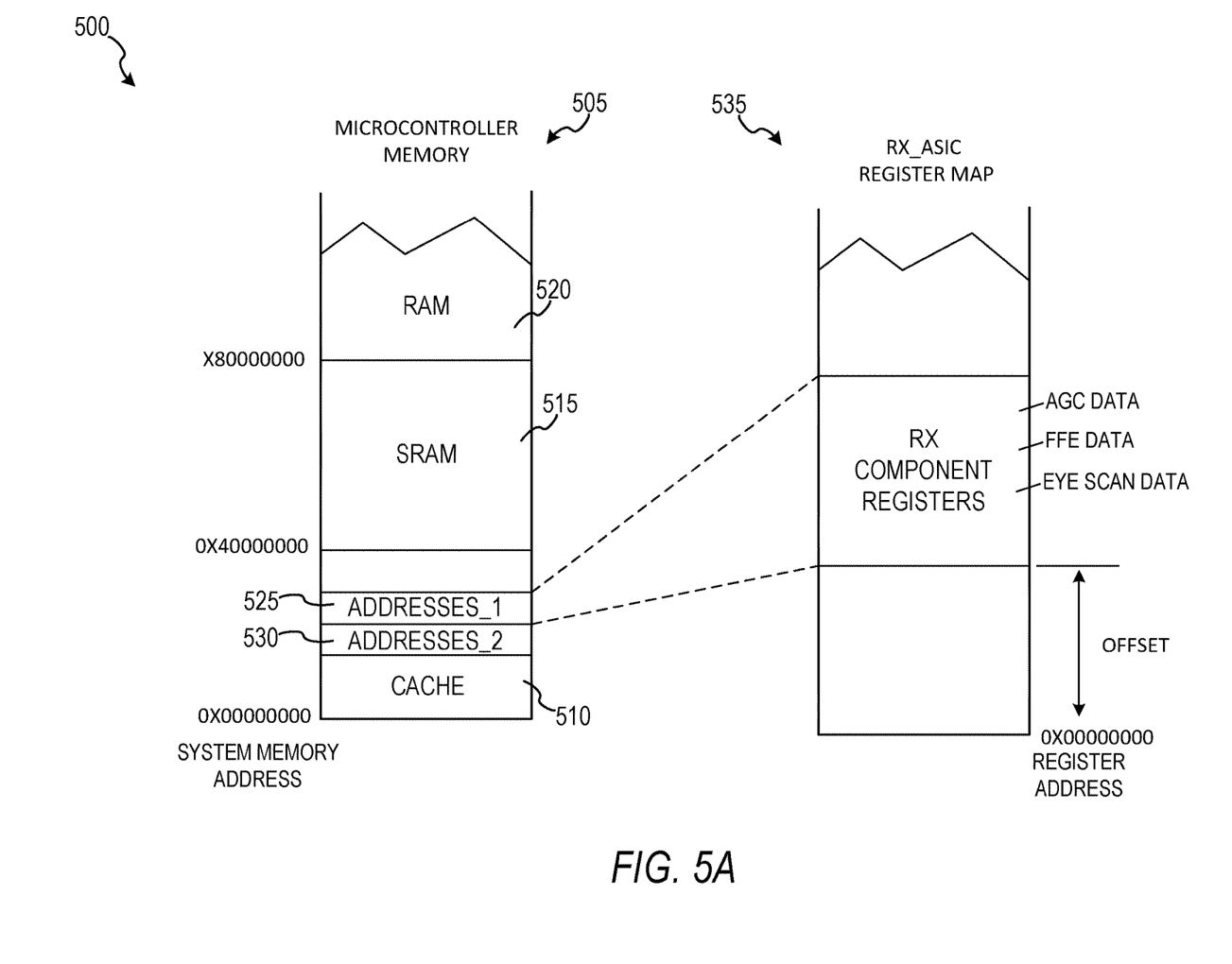
FIGS. 5A and 5B show QSPI mapping architectures, according to some example embodiments.
Figure 5B:
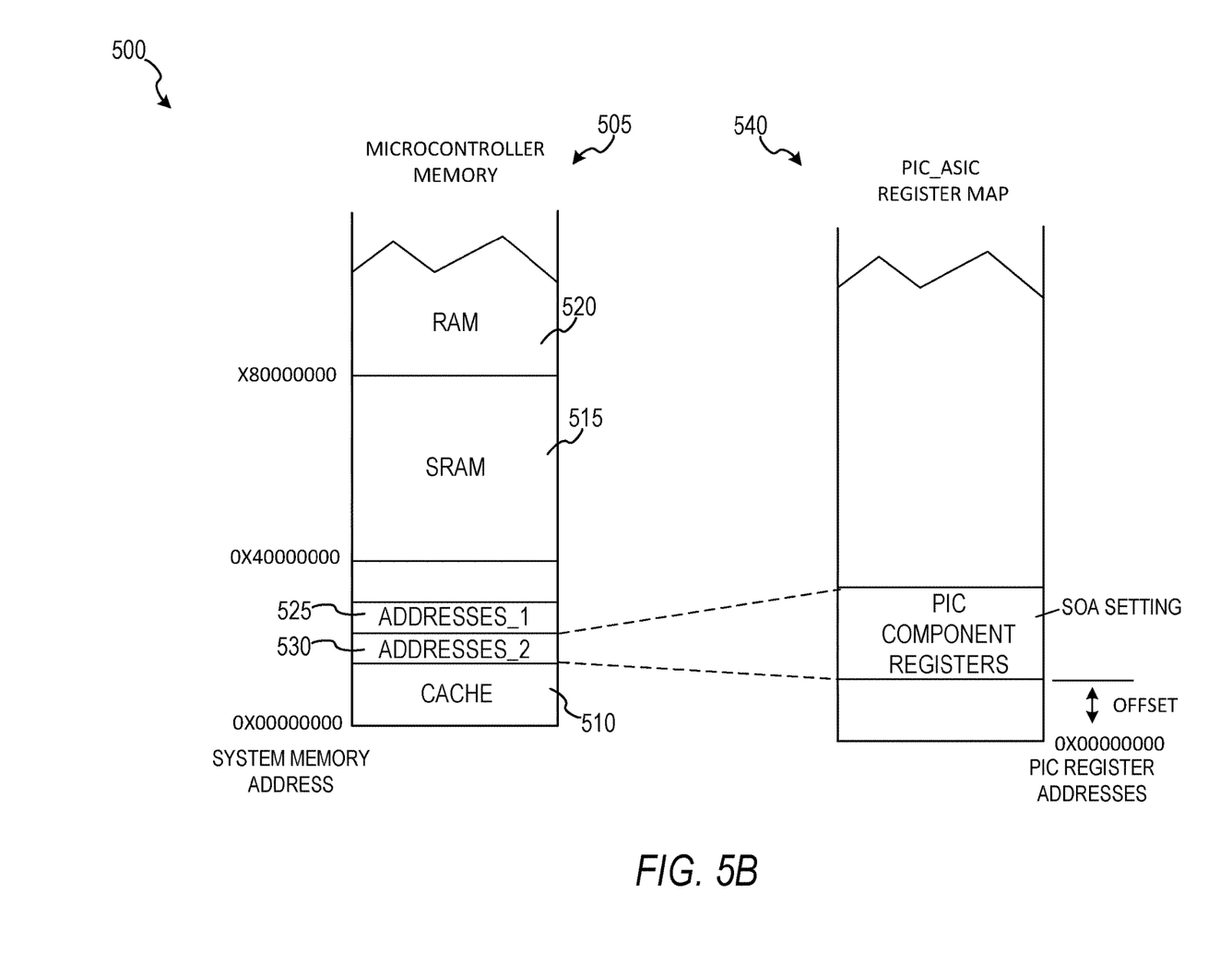

FIG. 4 shows QSPI-ASIC architecture 400 for accessing ASIC register data, according to some example embodiments. The microcontroller 405 ("uC") includes a QSPI primary interface 410 that can access and control different QSPI secondary interfaces 310, such as QSPI secondary interface 415 integrated in ASIC 420 ("ASIC_1") and QSPI secondary interface 430 of ASIC 425 ("ASIC_N"). The QSPI-ASIC architecture 400 can be implemented to perform linear and bulk interactions between the microcontroller 405 and registers of the ASICs. For example, microcontroller 405 can include microprocess instructions that specify local addresses of a cache 413 of the microcontroller 405. Although only a local cache 413 is illustrated in the example of FIG. 3, it is appreciated that the local memory addressed by the microprocess can be other types of memory, as shown in FIG. 5A and FIG. 5B and discussed in further detail below.

Each of the QSPI secondary interfaces includes decoders (e.g., hardwired or firmware decoder) that decodes received address data to local registers using offsets (e.g., decodes the address to a register address and imitates assembly instructions, such as load/store, on the ASIC. In some example embodiments, the QSPI primary interface 410 sends data to a given QPSI secondary interface of an ASIC using the architecture 300 (FIG. 3), where the address data in the address portion 310 may include an address of local memory of the microcontroller 405, which is then decoded by one of the QSPI secondary interfaces to a register address of a register storing data for the ASIC.

The example cache 413A illustrates the architecture 400 being used to perform linear access to the ASICs, according to some example embodiments. For example, the microcontroller 405 requests a microcontroller read from local memory in cache 413A to local memory mapped by the QSPI to registers in the first ASIC 420, and then later the microcontroller 405 requests a microcontroller read from another location in local memory mapped by QSPI to other registers in the second ASIC 425.

The example cache 413B illustrates the architecture 400 being used to perform bulk interfaces, according to some example embodiments. The bulk interactions can include bulk status updates (e.g., multiple ASIC status updates), bulk configuration interactions (e.g., multiple ASIC setting configurations), and bulk data interactions (e.g., bulk data read of a large dataset). The bulk interactions can be performed in the background (e.g., by a dedicated controller or circuit of the QSPI primary interface 410 using pre-fetch to pre-fetch each item of the bulk interaction) to cache register data from of the different ASICs to the cache 413 to enable the microcontroller 405 to interact with all of the ASIC by addressing the range of memory in the cache (bulk read from a range of the cache, bulk setting of components by writing to the cache 413 which causes writing to the registers on the respective ASICs, and so on).

As an example, a bulk status update can include requesting register data from specific registers in different ASICs, which can be initiated by a local memory read from the cache 413. For instance, each of the ASICs may be similar device that all have a laser driver, and the microcontroller 405 can request a bulk status update for a register value of the laser driver on each of the ASICs by reading from local memory mapped, via architecture 400, to registers embedded on each ASIC.

As another example in accordance with some example embodiments, a bulk configuration interaction can include writing data to enable or disable a component on each ASIC by writing to the component's register on each of the ASICs, where the writing is directed by the microcontroller 405 to the local cache 413 that is memory mapped to the corresponding registers on the different ASICs by the QSPI interfaces. As an additional example in accordance with some example embodiments, a bulk data interaction includes reading data from a component (e.g., the eye scan data from the receiver eye scan analyzer 253) from each of the ASICs.

FIG. 5A shows QSPI mapping architecture 500, according to some example embodiments. Microcontroller memory 505 is a system memory address map of different types of memory of the microcontroller, including for example random access memory (RAM) 520, static random access memory (SRAM) 515, and cache 510. The register map 535 is a map of the registers for components of the ASIC, such as the components in the data receiver 115 as shown in FIG. 2. The QSPI interface (e.g., QSPI primary interface 410, QSPI secondary interface 415) maps register memory of the ASIC so that it appears as local memory that is local to the microcontroller, such as address portion 525 and address portion 530 in the cache 510, which are addresses in the address scheme of the microcontroller. In some example embodiments, the mapping is implemented using Execute In Place (XIP) of QSPI, where the accesses are performed at the hardware level (e.g., without software instructions) to map addresses of the microcontroller to the off-chip register addresses of different ASICs, where each ASIC includes a hardware level address decoder, according to some example embodiments.

The address portion 525 includes one or more addresses of the microcontroller memory 505 that can be sent to the ASIC 420 (e.g., in address portion 310). The QSPI secondary interface 415 receives the address and decodes it to one or more offsets of registers of the ASIC register map 535. For example, one or more register addresses in the register map 535 can store AGC data from the AGC 237, another set of registers can store FFE data from the FFE 240, and another set of registers can store eye scan data from the receiver eye scan analyzer 253.

The address portion 530 in the cache 510 corresponds to a different ASIC, such as PIC 110, as illustrated in FIG. 5B. For example, the address portion 530 is another range of addresses of the cache 510 that can be sent (e.g., in address portion 310) to the ASIC 425 (e.g., PIC 110). The QSPI secondary interface 430 receives the address and decodes it to one or more registers of the PIC ASIC register map 540. For example, one or more registers in the register range of map 540 can store semiconductor amplifier settings used by a SOA 227.

Although in the example FIGS. 5A and 5B, "write" examples are discussed (in which local addresses sent e.g., in the address portion 310 from the microcontroller to the ASIC for decoding), in some example embodiments, register addresses are sent from the ASIC to the microcontroller for decoding (e.g., decoding of address, load and store assembly commands). For example, register address of the AGC 237 in the address portion 310 and gain setting data in the data portion 325 are sent to the microcontroller 405, and a QSPI primary interface decodes the register address to local addresses of the controller and stores the data at the local addresses for processing by the microcontroller 102.

Figure 6:
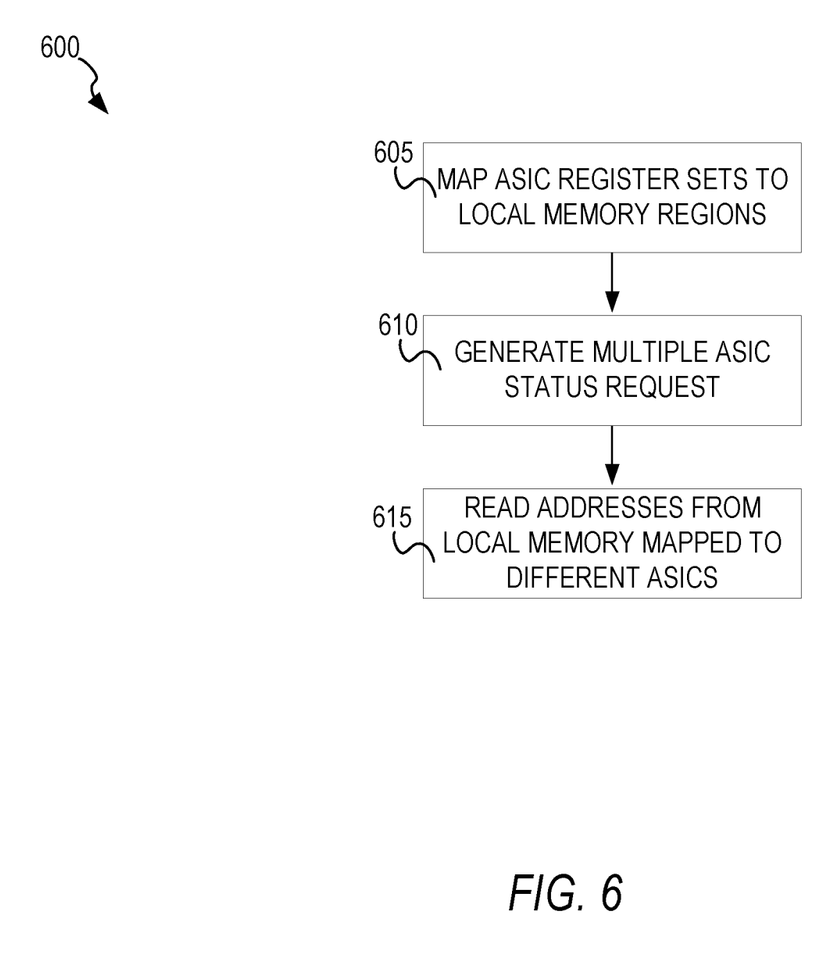
FIG. 6 shows a flow diagram of a method for performing microcontroller interactions with registers of ASICs, according to some example embodiments.

FIG. 6 shows a flow diagram of a method 600 for performing microcontroller interactions with registers of ASICs, according to some example embodiments. At operation 605, registers of the ASICs are mapped to different portions of local memory of the microcontroller. At operation 610, the microcontroller generates a multiple or bulk ASIC request for data from different registers of different ASICs (e.g., bulk status request for the statuses of components in the different ASICs). At operation 615, the microcontroller reads the data stored on the different registers of the different ASICs by reading memory local to the microcontroller. For example, the microcontroller reads address portion 525 for status data from ASIC 420 and reads portion 525 for status data from the ASIC 425).

Figure 7:
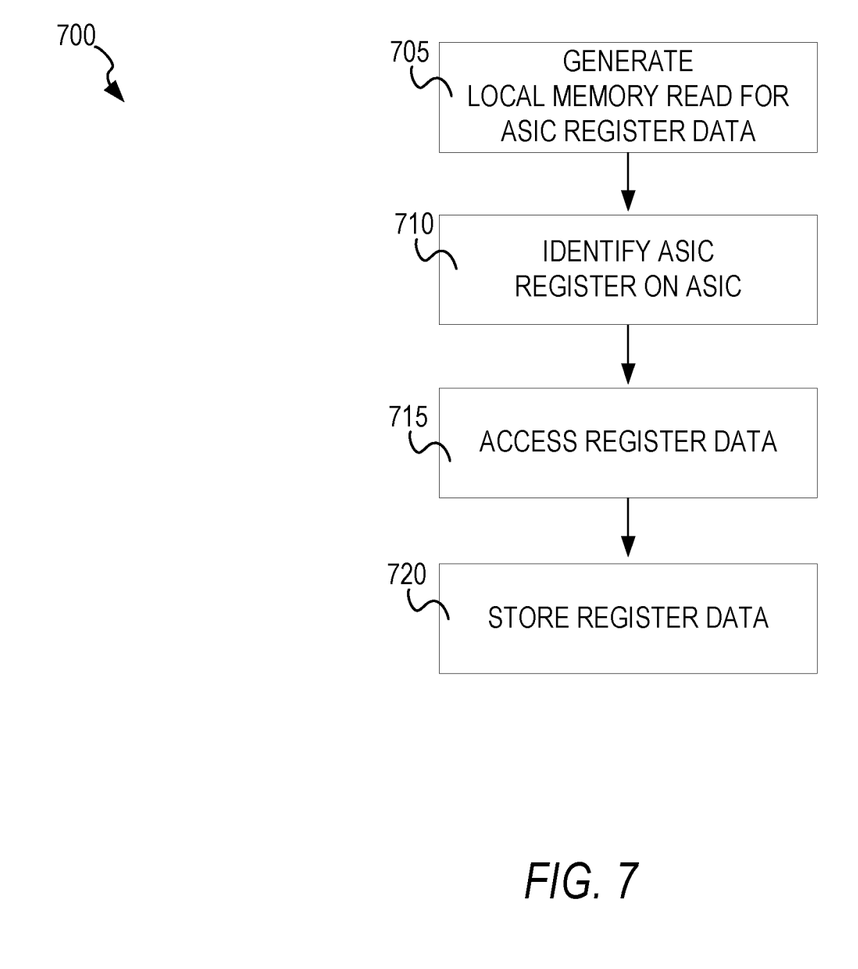
FIG. 7 shows a flow diagram of a method for accessing ASIC registers of different ASICs based on which portion of local memory is specified by the microcontroller, according to some example embodiments.

FIG. 7 shows a flow diagram of a method 700 for accessing ASIC registers of different ASICs based on which portion of local memory is specified by the microcontroller, according to some example embodiments. At operation 705, the microcontroller generates a read request for data stored in a register of an external ASIC where the request specifies an address of local memory. At operation 710, the ASIC register and ASIC are identified based on the local memory address. For example, the microcontroller requests AGC data by specifying the address portion 525 which is mapped to a specific ASIC (e.g., data receiver 115, ASIC 420).

At operation 715, the data stored on the register is accessed. For example, if the data is located in the first address portion, the chip select line selects the corresponding ASIC and sends a request for data in the address portion 525, and the ASIC responds (e.g., with the requested data and register address data in the address portion 310, which is then decoded to local memory address).

At operation 720, the register data is processed. For example, the register data is accessed on the ASIC and one or more processes are performed in response to the register data being read by the microcontroller. For instance, the AGC data stored in the register of the AGC on the data receiver is accessed and read by the microcontroller, and based on the value of the AGC register data the microcontroller may read or write other data, such as writing to another ASIC (e.g., setting an optical component setting on the transmitter or PIC).

Figure 8:
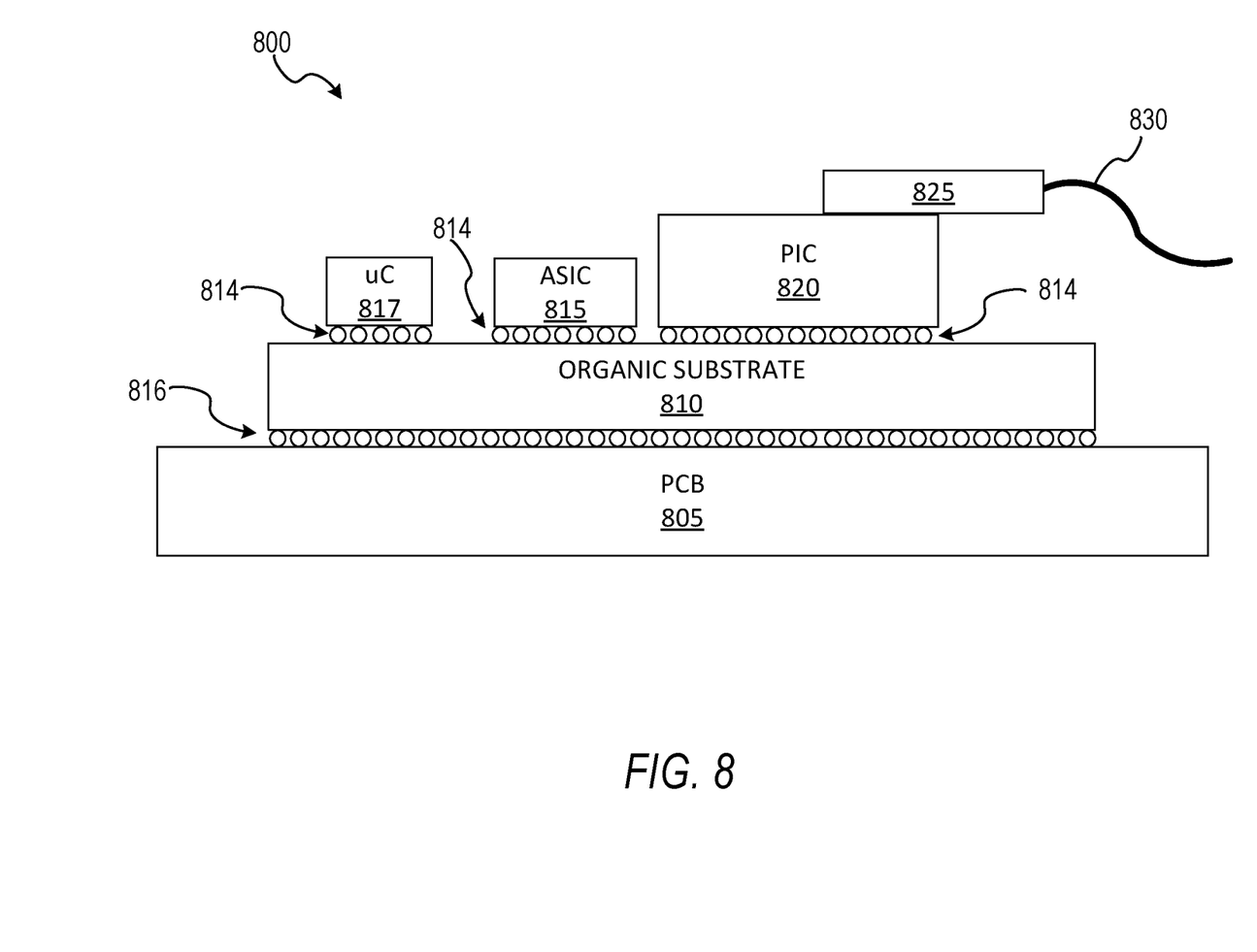
FIG. 8 is an illustration of an optical-electrical device including one or more optical devices, according to some example embodiments.

FIG. 8 is an illustration of an optical-electrical device 800 including one or more optical devices, according to some example embodiments. In this embodiment, the optical-electrical device 800 is a multi-structure chip package that includes a printed circuit board (PCB) 805, organic substrate 810, ASIC 815, a microcontroller 817 (uC), and PIC 820. In this embodiment, the PIC 820 may include one or more optical structures described above (e.g., PIC 110).

In some example embodiments, the PIC 820 includes silicon on insulator (SOI) or silicon-based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material. III-V semiconductors have elements that are found in group III and group V of the periodic table (e.g., Indium Gallium Arsenide Phosphide (InGaAsP), Gallium Indium Arsenide Nitride (GainAsN)). The carrier dispersion effects of III-V-based materials may be significantly higher than in silicon-based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light. Thus, III-V semiconductor materials enable photonic operation with an increased efficiency at generating light from electricity and converting light back into electricity.

The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides. Magneto-optic materials allow heterogeneous PICs to operate based on the magneto-optic (MO) effect. Such devices may utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as iron, cobalt, or yttrium iron garnet (YIG). Further, in some example embodiments, crystal substrate materials provide heterogeneous PICs with a high electro-mechanical coupling, linear electro optic coefficient, low transmission loss, and stable physical and chemical properties. Said crystal substrate materials may comprise, for example, lithium niobate (LiNbO3) or lithium tantalate (LiTaO3).

In the example illustrated, the PIC 820 exchanges light with fiber 830 via prism 825; said prism 825 is a misalignment-tolerant device used to couple an optical mode to one or more single-mode optical fibers (e.g., to transmit light to and from an optical network), according to some example embodiments. In some example embodiments, the optical devices of PIC 820 are controlled, at least in part, by control circuitry included in ASIC 815 (e.g., data transmitter 105, data receiver 115) and control instructions in the microcontroller 817. Although only a single ASIC 815 is shown in FIG. 8, it is appreciated that the multiple ASICs can be included optical-electrical device 800.

The ASIC 815, the microcontroller 817, and the PIC 820 are integrated circuits (ICs), e.g., chips, that are external to one another and are disposed on copper pillars 814 that electrically connect the ICs via organic substrate 860. PCB 805 is coupled to organic substrate 810 via ball grid array (BGA) interconnect 816, and may be used to interconnect the organic substrate 810 (and thus, ASIC 815 and PIC 820) to other components of optical-electrical device 800 not shown, such as interconnection modules, power supplies, and so forth.

The following are example embodiments:

Example 1. A method comprising: generating, by a microcontroller, a read request directed to an address of local memory in the microcontroller, the local memory including a plurality of local addressees mapped using a multi-serial peripheral interface to different application-specific integrated circuits (ASICs) that are electrically connected to the microcontroller, a first portion of the plurality of local addresses of the microcontroller mapped by the multi-serial peripheral interface to a first set of registers of a first ASIC, a second portion of the plurality of local addresses of the microcontroller mapped by the multi-serial peripheral interface to a second set of registers of a second ASIC, the different ASICs being accessed by the microcontroller based on locations of requested addresses being in different regions mapped, by the multi-serial peripheral interface, to the different ASICs; determining that the address of the local memory from the read request is mapped by the multi-serial peripheral interface to the second portion of the local memory; and based on the local address being in the second portion of the plurality of local addresses in local memory, reading, by the microcontroller using the multi-serial peripheral interface, register data from one or more registers of the second set of registers in the second ASIC and storing the register data at the address in the local memory of the microcontroller.

Example 2. The method of example 1, further comprising: generating a bulk status request for statuses of the different ASICs; and performing the bulk status request for status data from each ASIC, the bulk status request performed by the microcontroller by reading from the first portion and the second portion of the local memory of the microcontroller.

Example 3. The method of any of examples 1 or 2, wherein reading, by the microcontroller, from the first portion causes first status register data to be accessed from the first set of registers of the first ASIC using the multi-serial peripheral interface, and wherein reading, by the microcontroller, from the second portion causes second status register data to be accessed from the second set of registers of the second ASIC using the multi-serial peripheral interface.

Example 4. The method of any of examples 1-3, wherein the multi-serial peripheral interface comprises a plurality of bidirectional data lines that read data in parallel and write data in parallel.

Example 5. The method of any of examples 1-4, wherein the multi-serial peripheral interface is quad-serial peripheral interface (QSPI) having four bidirectional data lines that read data in parallel and write data in parallel.

Example 6. The method of any of examples 1-5, wherein the multi-serial peripheral interface comprises a chip select line to sequentially select a given ASIC of the different ASICs using the plurality of bidirectional data lines in parallel on the given ASIC.

Example 7. The method of any of examples 1-6, wherein the plurality of bidirectional data lines read the register data from the one or more registers of the second set of registers in the second ASIC in a read direction from the second ASIC to the microcontroller, and wherein the method further comprises: writing data to another register of a third ASIC using the plurality of bidirectional data lines in parallel in a write direction that is opposite of the read direction.

Example 8. The method of any of examples 1-7, wherein each address in the first portion of the plurality of local addresses map to different registers for different circuit components in the first ASIC.

Example 9. The method of any of examples 1-8, wherein the read request is a status request for operational data of an electrical circuit component in the first ASIC.

Example 10. The method of any of examples 1-9, wherein the electrical circuit component is a gain control for an amplifier in the first ASIC, and wherein the electrical circuit component is a monitor photodiode in the first ASIC.

Example 11. The method of any of examples 1-10, wherein the first ASIC and the second ASIC are electrically connected to the microcontroller by a plurality of metal contacts.

Example 12. A microcontroller device comprising a first application-specific integrated circuit (ASIC) interface connectable to a first ASIC comprising a first set of registers; a second ASIC interface connectable to a second ASIC comprising a second set of registers; and a microcontroller that is electrically connected to the first ASIC and the second ASIC in the microcontroller device, the microcontroller configured to generate a read request directed to an address of local memory in the microcontroller, the local memory including a plurality of local addressees mapped using a multi-serial peripheral interface to different application-specific integrated circuits that include the first ASIC and the second ASIC, a first portion of the plurality of local addresses of the microcontroller mapped by the multi-serial peripheral interface to the first set of registers of a first ASIC, a second portion of the plurality of local addresses of the microcontroller mapped by the multi-serial peripheral interface to the second set of registers of the second ASIC, the different ASICs being accessed by the microcontroller based on locations of requested addresses being in different regions mapped, by the multi-serial peripheral interface, to the different ASICs, wherein the microcontroller reads and stores, using the multi-serial peripheral interface, register data from one or more registers of the second set of registers in the second ASIC based on the local address in the read request being in the second portion of local memory.

Example 13. The microcontroller device of example 12, wherein the microcontroller generates a bulk status request for statuses of the different ASICs using the multi-serial peripheral interface, and wherein the microcontroller performs, using the multi-serial peripheral interface, the bulk status request for status data from each ASIC, the bulk status request performed by the microcontroller by reading from the first portion and the second portion of the local memory of the microcontroller.

Example 14. The microcontroller device of any of examples 12 or 13, wherein reading, by the microcontroller, from the first portion causes first status register data to be accessed from the first set of registers of the first ASIC using the multi-serial peripheral interface, and wherein reading, by the microcontroller, from the second portion causes second status register data to be accessed from the second set of registers of the second ASIC using the multi-serial peripheral interface.

Example 15. The microcontroller device of any of examples 12-14, wherein the multi-serial peripheral interface comprises a plurality of bidirectional data lines that read data in parallel and write data in parallel.

Example 16. The microcontroller device of any of examples 12-15, wherein the multi-serial peripheral interface is quad-serial peripheral interface (QSPI) having four bidirectional data lines that read data in parallel and write data in parallel.

Example 17. The microcontroller device of any of examples 12-16, wherein the multi-serial peripheral interface comprises a chip select line to sequentially select a given ASIC of the different ASICs using the plurality of bidirectional data lines in parallel on the given ASIC.

Example 18. The microcontroller device of any of examples 12-17, wherein the plurality of bidirectional data lines read the register data from the one or more registers of the second set of registers in the second ASIC in a read direction from the second ASIC to the microcontroller, and wherein the microcontroller is configured to write additional data to another register of a third ASIC using the plurality of bidirectional data lines in parallel in a write direction that is opposite of the read direction.

Example 19. The microcontroller device of any of examples 12-18, wherein each address in the first portion of the plurality of local addresses map to different registers for different circuit components in the first ASIC.

Example 20. The microcontroller device of any of examples 12-19, wherein the read request is a status request for operational data of an electrical circuit component in the first ASIC.

In the foregoing detailed description, the method and apparatus of the present inventive subject matter have been described with reference to specific exemplary embodiments thereof. It will, however, be evident that various modifications and changes may be made thereto without departing from the broader spirit and scope of the present inventive subject matter. The present specification and figures are accordingly to be regarded as illustrative rather than restrictive.

What is claimed is:

1. A method comprising:
generating, by a microcontroller, a read request directed to an address of local memory in the microcontroller, the local memory including a plurality of local addressees mapped using a primary multi-serial peripheral interface of the microcontroller to different secondary multi-serial peripheral interfaces of different application-specific integrated circuits (ASICs) that are electrically connected to the microcontroller in a hardware device, a first portion of the plurality of local addresses of the microcontroller mapped by the primary multi-serial peripheral interface to a first set of registers of a first ASIC, a second portion of the plurality of local addresses of the microcontroller mapped by the primary multi-serial peripheral interface to a second set of registers of a second ASIC, the different ASICs being accessed by the microcontroller based on locations of requested addresses in the local memory being in different regions including the first portion and the second portion of the plurality of local addresses;
generating, by the microcontroller, a bulk status request for statuses of the different ASICs; and
generating, by the microcontroller, bulk status data by reading from the first portion and the second portion of the plurality of local addresses of the microcontroller, the reading by the microcontroller from the first portion causing first status register data from the first set of registers to be provided by a secondary multi-serial peripheral interface in the first ASIC to the primary multi-serial peripheral interface in the microcontroller, the reading by the microcontroller from the second portion further causing second status register data from the second set of registers to be provided by another secondary multi-serial peripheral interface in the second ASIC to the primary multi-serial peripheral interface in the microcontroller.

2. The method of claim 1, wherein the local memory is cache memory of the microcontroller.

3. The method of claim 2, wherein the first portion is a first cache address portion of the cache memory that when accessed by the microcontroller causes access to the first set of registers of the first ASIC, wherein the second portion is a second cache address portion of the cache memory that when accessed by the microcontroller causes access to the second set of registers of the second ASIC, and wherein the first cache address portion and the second cache address portion are located at different address offsets of the cache memory of the microcontroller.

4. The method of claim 1, wherein the primary multi-serial peripheral interface and a secondary multi-serial peripheral interface of one of the different ASICs read data in parallel and write data in parallel using a plurality of bidirectional data lines.

5. The method of claim 4, wherein the primary multi-serial peripheral interface and the secondary multi-serial peripheral interface are quad-serial peripheral interfaces.

6. The method of claim 4, wherein the primary multi-serial peripheral interface implements a chip select line to sequentially select a given ASIC of the different ASICs.

7. The method of claim 4, wherein the plurality of bidirectional data lines read the data from the second set of registers in the second ASIC in a read direction from the second ASIC to the microcontroller, and wherein the method further comprises: writing data to another register of a third ASIC using the plurality of bidirectional data lines in parallel in a write direction that is opposite of the read direction.

8. The method of claim 1, wherein each address in the first portion of the plurality of local addresses map to different registers for different circuit components in the first ASIC.

9. The method of claim 8, wherein the read request is a status request for operational data of an electrical circuit component in the first ASIC and another electrical circuit component in the second ASIC.

10. The method of claim 9, wherein the electrical circuit component is a gain control for an amplifier in the first ASIC, and wherein the another electrical circuit component is a monitor photodiode in the second ASIC.

11. The method of claim 1, wherein the first ASIC and the second ASIC are electrically connected to the microcontroller by a plurality of metal contacts.

12. A microcontroller device comprising:
a first application-specific integrated circuit (ASIC) interface connectable to a first ASIC comprising a first set of registers;
a second ASIC interface connectable to a second ASIC comprising a second set of registers; and
a microcontroller that is electrically connected to the first ASIC and the second ASIC in the microcontroller device, the microcontroller configured to generate a read request directed to an address of local memory in the microcontroller, the local memory including a plurality of local addressees mapped using a primary multi-serial peripheral interface of the microcontroller to secondary multi-serial peripheral interfaces of different application-specific integrated circuits that include the first ASIC and the second ASIC, a first portion of the plurality of local addresses of the microcontroller mapped by the primary multi-serial peripheral interface to the first set of registers of the first ASIC, a second portion of the plurality of local addresses of the microcontroller mapped by the primary multi-serial peripheral interface to the second set of registers of the second ASIC, the different ASICs being accessed by the microcontroller based on locations of requested addresses in the local memory being in different regions including the first portion and the second portion of the plurality of local addresses, the microcontroller being configured to generate a bulk status request for statuses of the different ASICs using the primary multi-serial peripheral interface, the microcontroller further being configured to generate bulk status data by reading from the first portion and the second portion of the plurality of local addresses of the microcontroller, the reading by the microcontroller from the first portion causes first status register data from the first set of registers to be provided by a secondary multi-serial peripheral interface in the first ASIC to the primary multi-serial peripheral interface in the microcontroller, the reading by the microcontroller from the second portion further causes second status register data from the second set of registers to be provided by another secondary multi-serial peripheral interface in the second ASIC to the primary multi-serial peripheral interface in the microcontroller.

13. The microcontroller device of claim 12, wherein the local memory is cache memory of the microcontroller.

14. The microcontroller device of claim 13, wherein the first portion is a first cache address portion of the cache memory that when accessed by the microcontroller causes access to the first set of registers of the first ASIC, wherein the second portion is a second cache address portion of the cache memory that when accessed by the microcontroller causes access to the second set of registers of the second ASIC, and wherein the first cache address portion and the second cache address portion are located at different address offsets of the cache memory of the microcontroller.

15. The microcontroller device of claim 12, wherein the primary multi-serial peripheral interface and a secondary multi-serial peripheral interface of one of the different ASICs read data in parallel and write data in parallel using a plurality of bidirectional data lines.

16. The microcontroller device of claim 15, wherein the primary multi-serial peripheral interface and the secondary multi-serial peripheral interface are quad-serial peripheral interfaces.

17. The microcontroller device of claim 15, wherein the primary multi-serial peripheral interface implements a chip select line to sequentially select a given ASIC of the different ASICs.

18. The microcontroller device of claim 15, wherein the plurality of bidirectional data lines read the data from the second set of registers in the second ASIC in a read direction from the second ASIC to the microcontroller, and wherein the microcontroller is configured to write additional data to another register of a third ASIC using the plurality of bidirectional data lines in parallel in a write direction that is opposite of the read direction.

19. The microcontroller device of claim 12, wherein each address in the first portion of the plurality of local addresses map to different registers for different circuit components in the first ASIC.

20. The microcontroller device of claim 19, wherein the read request is a status request for operational data of an electrical circuit component in the first ASIC and another electrical circuit component in the second ASIC.

\* \* \* \* \*